US011549445B2

(12) United States Patent
Tu

(10) Patent No.: US 11,549,445 B2
(45) Date of Patent: Jan. 10, 2023

(54) HIGH AND LOW SPOOL DIFFERENTIAL GEAR ASSEMBLY

(71) Applicant: United Technologies Corporation, Farmington, CT (US)

(72) Inventor: Mark Tu, East Hampton, CT (US)

(73) Assignee: Raytheon Technologies Corporation, Farmington, CT (US)

(*) Notice: Subject to any disclaimer, the term of this patent is extended or adjusted under 35 U.S.C. 154(b) by 177 days.

(21) Appl. No.: 16/806,499

(22) Filed: Mar. 2, 2020

(65) Prior Publication Data
US 2020/0378310 A1 Dec. 3, 2020

Related U.S. Application Data

(60) Provisional application No. 62/842,186, filed on May 2, 2019.

(51) Int. Cl.
*F02C 7/36* (2006.01)
*F02C 7/06* (2006.01)
*F02C 7/32* (2006.01)

(52) U.S. Cl.
CPC .................. *F02C 7/36* (2013.01); *F02C 7/06* (2013.01); *F02C 7/32* (2013.01);
(Continued)

(58) Field of Classification Search
CPC ...... F02C 7/06; F02C 7/32; F02C 7/36; F05D 2220/323; F05D 2240/50; F05D 2240/60;
(Continued)

(56) References Cited

U.S. PATENT DOCUMENTS 7,882,691 B2    2/2011  Lemmers, Jr. et al.
8,814,502 B2    8/2014  Eleftheriou
(Continued)

FOREIGN PATENT DOCUMENTS

GB        2197392 A      5/1988
WO   WO-2008044973 A1 *  4/2008   .............. F02C 7/275

OTHER PUBLICATIONS

Extended European Search Report for EP Application No. 20160221.6, dated Sep. 18, 2020, 8 pages.

*Primary Examiner* — Woody A Lee, Jr.
*Assistant Examiner* — Jesse M Prager
(74) *Attorney, Agent, or Firm* — Kinney & Lange, P.A.

(57) ABSTRACT

An example embodiment of a turbine engine assembly includes a low spool including a low spool accessory drive gear driven by a low rotor shaft, a high spool including a high spool accessory drive gear driven by a high rotor shaft concentric around a portion of the low rotor shaft, and a differential gear assembly adapted to offtake power from rotation of one or both of the low spool and the high spool to drive one or more accessory loads. The differential gear assembly includes a differential bullgear and one or more idler gears each including a plurality of teeth meshed with the low spool accessory drive gear and the high spool accessory drive gear, and a bearing surface. The differential bull gear includes a plurality of teeth and a corresponding at least one bearing surface engaging with the bearing surface of each of the one or more idler gears. The plurality of teeth are adapted to mesh with an accessory drive system to transfer the power offtake and drive the one or more accessory loads.

8 Claims, 3 Drawing Sheets

(52) U.S. Cl.
CPC .... *F05D 2220/323* (2013.01); *F05D 2240/50* (2013.01); *F05D 2240/60* (2013.01); *F05D 2260/40311* (2013.01); *F05D 2270/053* (2013.01); *F05D 2270/304* (2013.01); *F05D 2270/331* (2013.01)

(58) Field of Classification Search
CPC ..... F05D 2260/40311; F05D 2270/053; F05D 2270/304; F05D 2270/331
See application file for complete search history.

(56) References Cited

U.S. PATENT DOCUMENTS

| | | |
|---|---|---|
| 9,200,592 B2 | 12/2015 | Berryann et al. |
| 9,347,373 B2 * | 5/2016 | Menheere ............... F02C 3/107 |
| 2006/0034693 A1 | 2/2006 | Lardellier |
| 2010/0093482 A1 | 4/2010 | Allmendinger et al. |
| 2018/0149091 A1 | 5/2018 | Howell et al. |
| 2018/0283281 A1 | 10/2018 | Veilleux, Jr. et al. |

* cited by examiner

HIGH AND LOW SPOOL DIFFERENTIAL GEAR ASSEMBLY

CROSS-REFERENCE TO RELATED APPLICATION(S)

This application claims the benefit of U.S. Provisional Application No. 62/842,186 filed May 2, 2019 for "HIGH AND LOW SPOOL DIFFERENTIAL GEAR ASSEMBLY" by Mark Tu.

STATEMENT OF GOVERNMENT INTEREST

This invention was made with Government support awarded by the United States. The Government has certain rights in this invention

BACKGROUND

The disclosure relates generally to turbine engines and more specifically to driving accessories of a turbine engine.

Additional demands on large military and commercial engines solely utilize the high spool rotor to extract horsepower and power accessories including fuel/oil pumps, PMAG, and aircraft accessory pumps. With increasing demand for horsepower extraction to power additional accessories and provide more electrical power, extraction limits of the high rotor are being reached and there is a need for additional horsepower. At the very least, it would be useful to better balance the extraction demands between more than one spool.

However, the "penalties" for current modes of extracting power from more than one spool at a time, add complexity, weight, cost, and maintainability that present challenges to utilizing a second lower spool.

SUMMARY

An example embodiment of a turbine engine assembly includes a low spool including a low spool accessory drive gear driven by a low rotor shaft, a high spool including a high spool accessory drive gear driven by a high rotor shaft concentric around a portion of the low rotor shaft, and a differential gear assembly adapted to offtake power from rotation of one or both of the low spool and the high spool to drive one or more accessory loads. The differential gear assembly includes a differential bullgear and one or more idler gears each including a plurality of teeth meshed with the low spool accessory drive gear and the high spool accessory drive gear, and a bearing surface. The differential bull gear includes a plurality of teeth and a corresponding at least one bearing surface engaging with the bearing surface of each of the one or more idler gears. The plurality of teeth are adapted to mesh with an accessory drive system to transfer the power offtake and drive the one or more accessory loads.

An embodiment of a differential gear assembly for a pair of counter rotating concentric drive shafts includes a first idler gear and a differential bull gear. The first idler gear includes a plurality of idler teeth adapted to mesh with a first accessory drive gear connected to a first of the concentric drive shafts. The differential bull gear includes a plurality of differential teeth and a corresponding at least one bearing surface engaging with a bearing surface of at least the first idler gears. The plurality of differential teeth adapted to mesh with an accessory drive system to transfer a first power offtake from the first of the concentric drive shafts and a second power offtake from a second of the concentric drive shafts to drive one or more accessory loads.

DETAILED DESCRIPTION

Figure 1:
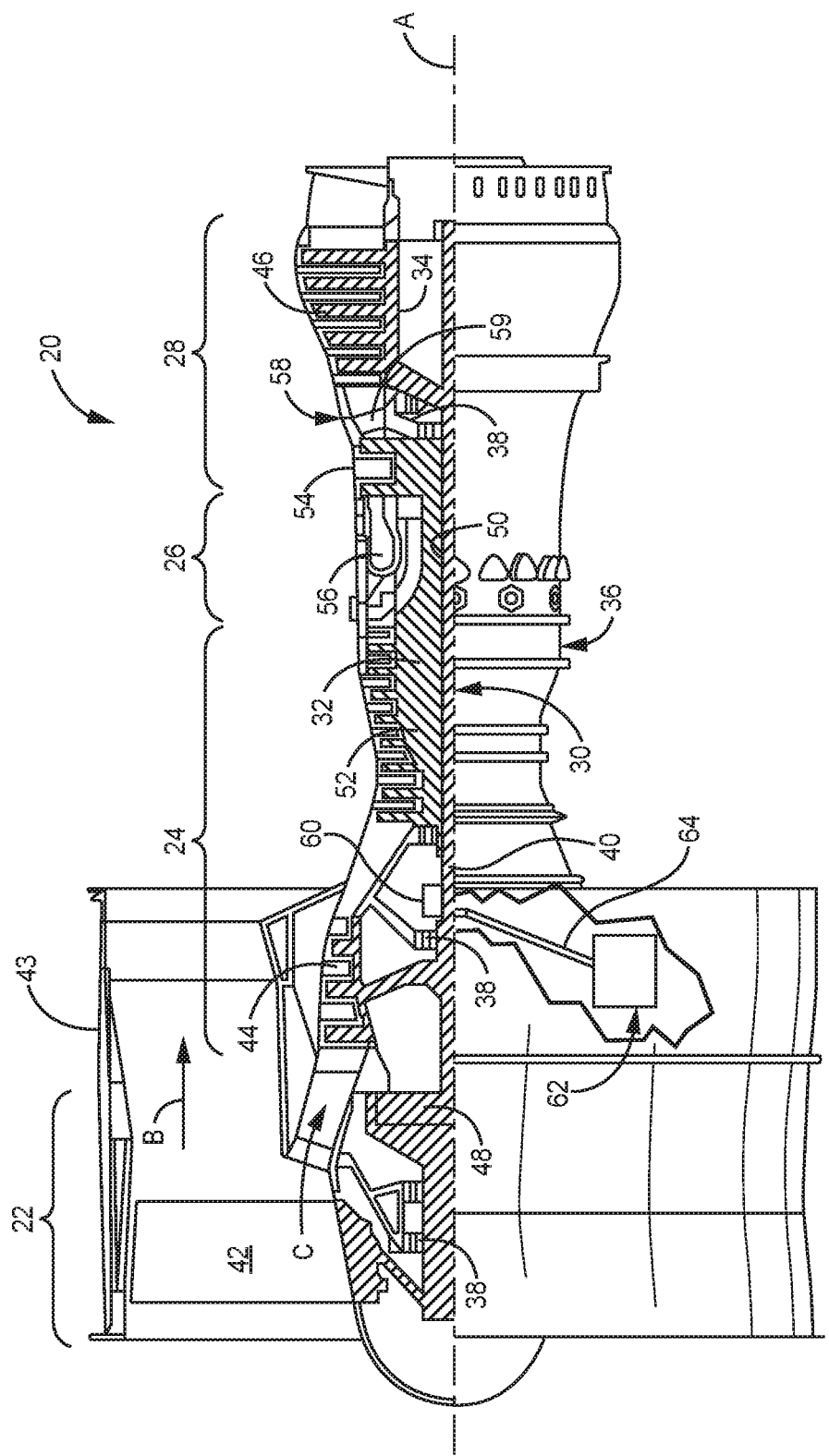
FIG. 1 is a schematic quarter-section of a gas turbine engine.

FIG. 1 is a quarter-sectional view that schematically illustrates example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes low speed spool 30 and high speed spool 32 mounted for rotation about center axis A of gas turbine engine 20 relative to engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about center axis A.

Combustor 56 is arranged between high pressure compressor 52 and high pressure turbine 54. In one example, high pressure turbine 54 includes at least two stages to provide double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 can be arranged generally between high pressure turbine 54 and low pressure turbine 46. Mid-turbine frame 58 further supports bearing systems 38 in turbine section 28 as well as setting airflow entering the low pressure turbine 46.

The core airflow C is compressed first by low pressure compressor 44 and then by high pressure compressor 52 mixed with fuel and ignited in combustor 56 to produce high speed exhaust gases that are then expanded through high pressure turbine 54 and low pressure turbine 46. Mid-turbine frame 58 includes vanes 59, which are in the core airflow path and function as an inlet guide vane for low pressure turbine 46. Utilizing vanes 59 of mid-turbine frame 58 as the inlet guide vanes for low pressure turbine 46 decreases the axial length of the low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

Figure 2:
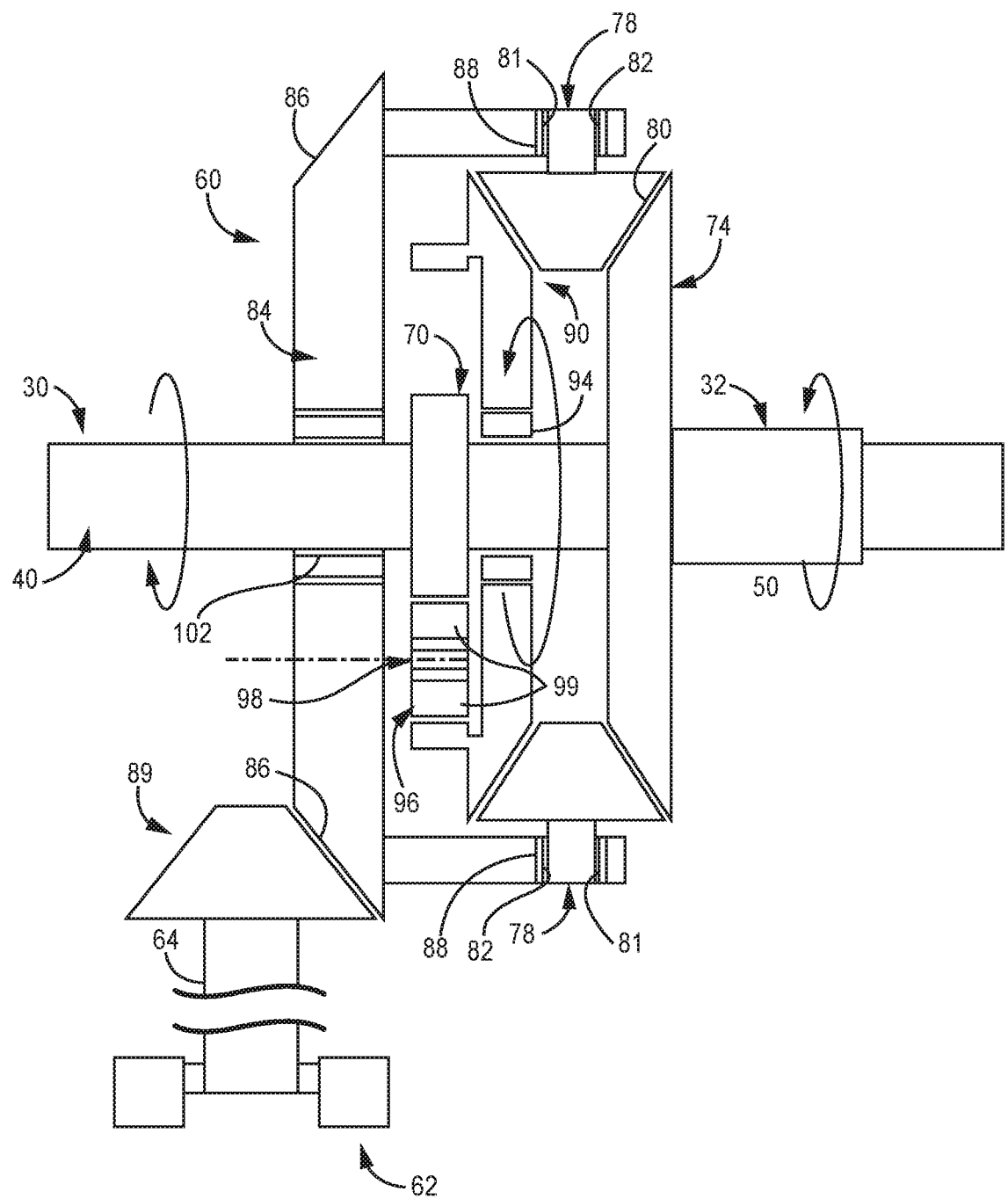
FIG. 2 shows a first example embodiment of a differential gear assembly incorporated with a low and high spool.

It will be recognized that the terms high and low, unless described in another way, are relative. For example, a low spool generally connects a low pressure compressor and a low pressure turbine, while a high spool generally connects a high pressure compressor and a high pressure turbine. Most often the high spool rotates faster than the low spool. Further, though shown as a two-spool engine, it will be appreciated by the skilled artisan that the teachings can be readily adapted to other engine configurations, such as a three-spool engine. Differential gear assembly 60 can be modified and relocated as needed to offtake power from a turbine assembly having any two concentric counter-rotating shafts/spools such as high and intermediate, intermediate and low, and likely, high and low FIG. 2 shows details of a first example embodiment of differential gear assembly 60 providing power to accessory system 62 from both low spool 30 and high spool 32. As noted with respect to FIG. 1, low spool 30 includes low spool accessory drive gear 70 driven by low rotor shaft 40, while high spool 32 includes high spool accessory drive gear 74 driven by high rotor shaft 50 concentric around at least a portion of low rotor shaft 40.

As noted above, these embodiments of a differential gear assembly (60 in FIG. 2) are designed around a counter-rotating shaft configuration. That is, low spool 40 rotates clockwise and high spool 50 rotates counter-clockwise or vice versa. Differential gear assembly 60 is adapted to offtake power from rotation of one or both of low spool 30 and high spool 32, and includes one or more idler gears 78. Each includes a plurality of teeth 80 meshed with low spool accessory drive gear 70 and high spool accessory drive gear 74. Bearing surface 80 supports idler bearing assembly 82, which in turn connects idler gear(s) 78 with differential bullgear 84.

Differential bull gear 84 includes a plurality of differential gear teeth 86 and a corresponding at least differential bearing surface 88 engaging with idler bearing surface 80 of each of the one or more idler gears 78. The plurality of differential gear teeth 86 are adapted to mesh with accessory drive system 62 to transfer the power offtakes from each spool and drive one or more accessory loads 89. This may be via an accessory drive shaft, such as but not limited to towershaft 86, or another configuration depending on the particular engine architecture.

Figure 3:
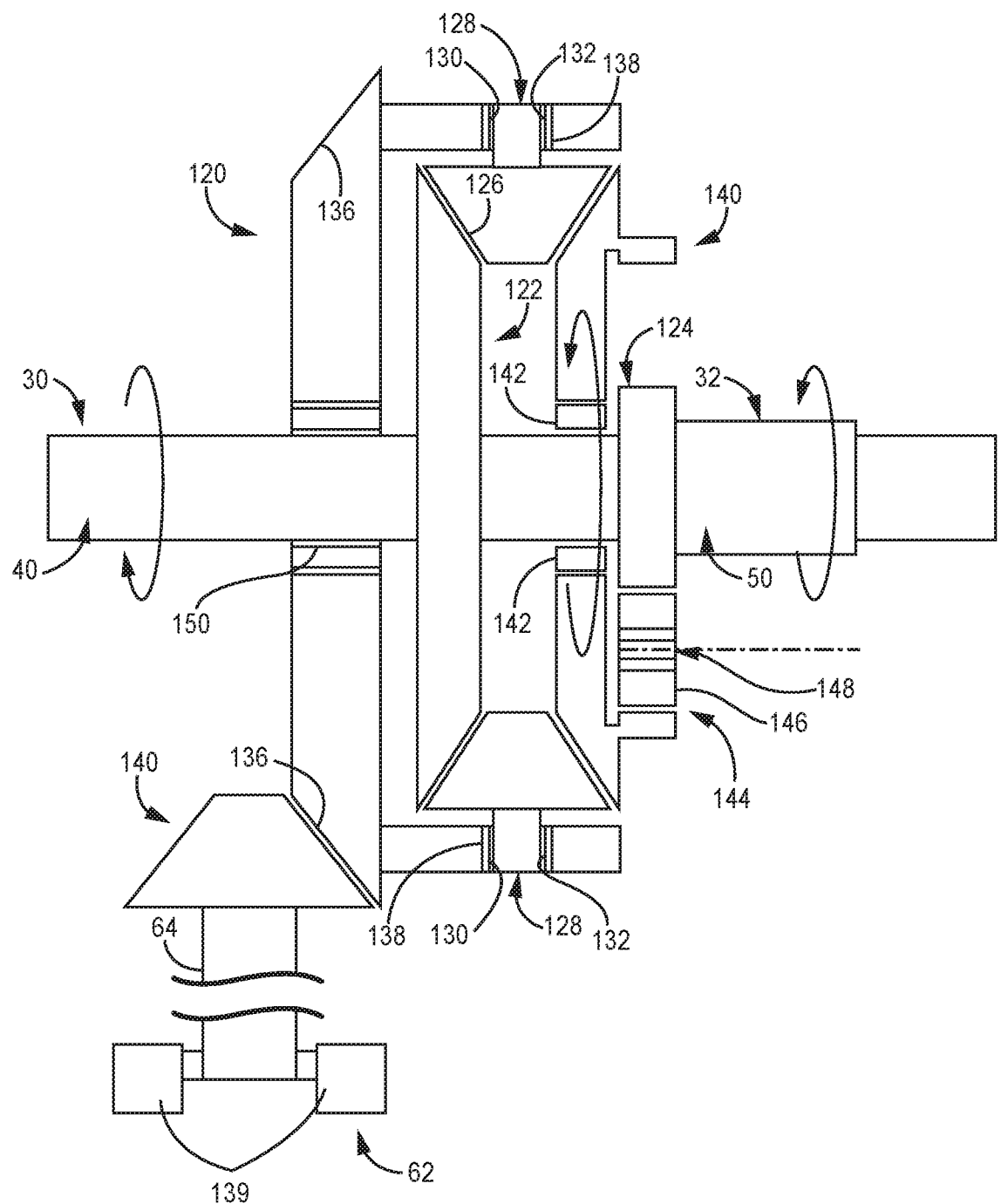
FIG. 3 shows a second example embodiment of a differential gear assembly incorporated with a low and high spool.

Note that accessory drive gears 70, 74 have heretofore been described generally. In the example embodiment of FIG. 2, low spool accessory drive gear 70 includes at least a ring gear assembly, while high spool accessory drive gear 74 includes a standard bull gear. FIG. 3 will show an embodiment where these elements are reversed, and the configuration changes necessary to the differential gear assembly will be described accordingly.

In both cases, ring gear assembly generally includes ring gear 90 supported to low rotor shaft 40 by a plurality of ring gear bearings 94, and pinion gear 96 meshed with ring gear 90. Pinion gear 96 includes a fixed central portion 98 mounted to a fixed surface of the engine shown in FIG. 1. Outer rotatable portion 99 of pinion gear 96 is rotatable about fixed central portion 98 to facilitate transfer between ring gear 90 and differential assembly 60. Here, outer portion 98 meshes with ring gear 90 and low rotor shaft 40 (or high rotor shaft 50 as in FIG. 3) to drive rotation of ring gear 90 about the low rotor shaft. Also in both example embodiments, the differential bullgear (84 in FIG. 2) is shown to be supported to low rotor shaft 40 by another plurality of bearings 102. Alternatively, in both FIG. 2 and FIG. 3, the example embodiment can be adapted in another way such that both the differential bullgear and ring gear are "free spinning" relative to any of the shafts or spools. One non-limiting alternative includes supporting one or both of these gears to fixed part of the engine such as the case, while still allowing for different rotational speeds relative to one or more shafts.

A size of differential bullgear 84 and a gear ratio of differential bullgear 84 relative to towershaft 86, are selected to selectively offtake a first portion of power from the low spool and a second portion of power from the high spool to drive a plurality of accessories (loads 89) connected to the towershaft. Preferably, selective offtake of first and second portions of power continuously maintain a minimum excess power margin on each of low and high spools 40, 50. Selective offtake from each spool 40, 50, can depend at least in part on instantaneous accessory load and on relative engine speed.

FIG. 3 shows details of a second example embodiment of differential gear assembly 120 providing power to accessory system 62 from both counter-rotating low spool 30 and high spool 32. As with FIGS. 1 and 2, low spool 30 includes low spool accessory drive gear 122 driven by low rotor shaft 40, while high spool 32 includes high spool accessory drive gear 124 driven by high rotor shaft 50 concentric around at least a portion of low rotor shaft 40.

Differential gear assembly 120 is adapted to offtake power from rotation of one or both of low spool 30 and high spool 32, and includes one or more idler gears 128. Each includes a plurality of teeth 126 meshed with low spool accessory drive gear 122 and high spool accessory drive gear 124. Bearing surface 130 supports idler bearing assembly 132, which in turn connects idler gear(s) 128 with differential bullgear 134.

Similar to FIG. 2, differential bullgear 134 includes a plurality of differential gear teeth 136 and a corresponding at least one differential bearing surface 138 engaging with idler bearing surface 140 of each of the one or more idler gears 128. The plurality of differential gear teeth 136 are adapted to mesh with accessory drive system 62 to transfer the power offtakes from each spool and drive one or more accessory loads 139. This may be via an accessory drive shaft, such as but not limited to towershaft 136, or another configuration depending on the particular engine architecture.

Note that in the example embodiment of FIG. 2, low spool accessory drive gear 70 includes at least a ring gear assembly, while high spool accessory drive gear 74 includes a standard bull gear. FIG. 3 shows an embodiment where these elements are reversed, namely, low spool accessory drive gear 122 includes at least a standard bull gear, while high spool accessory drive gear 124 includes at least a ring gear assembly.

In both cases, ring gear assembly 124 generally includes ring gear 140 supported to low rotor shaft 40 by a plurality of ring gear bearings 142, and pinion gear 144 meshed with ring gear 140. Pinion gear 144 includes a fixed central portion 148 mounted to a fixed surface of the engine shown in FIG. 1. Outer rotatable portion 146 of pinion gear 144 is rotatable about fixed central portion 148 to facilitate transfer between ring gear 140 and differential assembly 120. Here, outer portion 146 meshes with ring gear 140 and high rotor shaft 50 to drive rotation of ring gear 140 about low rotor shaft 40. Also in both example embodiments, the differential bullgear (84 in FIG. 2, 134 in FIG. 3) is supported to low rotor shaft 40 by another plurality of bearings 150. Similar to the example embodiment of FIG. 2, the example embodiment in FIG. 3 can be adapted in another way such that both the differential bullgear and ring gear are "free spinning" relative to any of the shafts or spools. One non-limiting alternative includes supporting one or both of these gears to fixed part of the engine such as the case, while still allowing for different rotational speeds relative to one or more shafts.

A size of differential bullgear 134 and a gear ratio of differential bullgear 134 relative to towershaft 136, are selected to selectively offtake a first portion of power from low spool 40 and a second portion of power from high spool 50 to drive accessories/loads 139 connected to towershaft. Preferably, selective offtake of first and second portions of power continuously maintain a minimum excess power margin on each of low and high spools 40, 50. Selective offtake from each spool 40, 50 can depend at least in part on instantaneous accessory load and on relative engine speed.

It will be recognized that the "first" and "second" portions of power referenced in the preceding paragraph, and throughout the instant document merely are used to allow the reader to differentiate between the "first" power offtake from the low spool and the "second" power offtake from the high spool. Absent any explicit statement to the contrary, the "first" portion of power offtake is not necessarily greater than, equal to, or less than the "second" portion of power offtake at any given time or operational condition. Generally, but not exclusively, more power will be taken from the high spool during low engine speeds. Additional power may be taken from the low spool at higher engine speeds or during acceleration, but (a) this does not always exceed the amount of power taken from the high spool, and (b) other parameters and load demands will always affect the instantaneous and total distribution of power offtake between the low and high spools during any given flight cycle.

DISCUSSION OF POSSIBLE EMBODIMENTS

The following are non-exclusive embodiments of the present disclosure.

An example embodiment of a turbine engine assembly includes a low spool including a low spool accessory drive gear driven by a low rotor shaft, a high spool including a high spool accessory drive gear driven by a high rotor shaft concentric around a portion of the low rotor shaft, and a differential gear assembly adapted to offtake power from rotation of one or both of the low spool and the high spool to drive one or more accessory loads. The differential gear assembly includes a differential bullgear and one or more idler gears each including a plurality of teeth meshed with the low spool accessory drive gear and the high spool accessory drive gear, and a bearing surface. The differential bull gear includes a plurality of teeth and a corresponding at least one bearing surface engaging with the bearing surface of each of the one or more idler gears. The plurality of teeth are adapted to mesh with an accessory drive system to transfer the power offtake and drive the one or more accessory loads.

The assembly of the preceding paragraph can optionally include any one or more of the following features, configurations and/or additional components:

A further example of the foregoing assembly, wherein the low spool accessory drive gear comprises one of a ring gear assembly and a bull gear.

A further example of any of the foregoing assemblies, wherein the high spool accessory drive gear comprises the other of the ring gear assembly and the bull gear.

A further example of any of the foregoing assemblies, wherein the ring gear assembly includes a ring gear supported to the low rotor shaft by a first plurality of bearings; and a pinion gear meshed with the ring gear.

A further example of any of the foregoing assemblies, wherein a fixed central portion of the pinion gear is mounted to a fixed surface of the engine.

A further example of any of the foregoing assemblies, wherein an outer portion of the pinion gear is rotatable about the fixed central portion.

A further example of any of the foregoing assemblies, wherein the outer portion meshes with the ring gear and the low rotor shaft or the high rotor shaft to drive rotation of the ring gear about the low rotor shaft.

A further example of any of the foregoing assemblies, wherein the differential bullgear is supported to the low rotor shaft by a second plurality of bearings.

A further example of any of the foregoing assemblies, wherein the low rotor shaft rotates in a first direction and the high rotor shaft rotates in a second direction opposite the first direction.

A further example of any of the foregoing assemblies, further comprising an accessory drive shaft as part of the accessory drive system.

A further example of any of the foregoing assemblies, wherein the accessory drive shaft comprises a towershaft.

A further example of any of the foregoing assemblies, wherein a size of the differential bullgear and a gear ratio of the differential bullgear, relative to the towershaft, are selected to selectively offtake a first portion of power from the low spool and a second portion of power from the high spool to drive a plurality of accessories connected to the towershaft.

A further example of any of the foregoing assemblies, wherein the selective offtake of first and second portions of power continuously maintain a minimum excess power margin on each of the low and high spools.

A further example of any of the foregoing assemblies, wherein the selective offtake depends at least in part on instantaneous accessory load and on relative engine speed.

An embodiment of a differential gear assembly for a pair of counter rotating concentric drive shafts includes a first idler gear and a differential bull gear. The first idler gear includes a plurality of idler teeth adapted to mesh with a first accessory drive gear connected to a first of the concentric drive shafts. The differential bull gear includes a plurality of differential teeth and a corresponding at least one bearing surface engaging with a bearing surface of at least the first idler gears. The plurality of differential teeth adapted to mesh with an accessory drive system to transfer a first power offtake from the first of the concentric drive shafts and a second power offtake from a second of the concentric drive shafts to drive one or more accessory loads.

The assembly of the preceding paragraph can optionally include any one or more of the following features, configurations and/or additional components:

A further example of the foregoing assembly, further comprising a ring gear assembly comprising a ring gear supported to the first or second of the concentric drive shaft via a first plurality of bearings; and a pinion gear meshed with the ring gear, the pinion gear including a fixed central portion of the pinion gear mounted to a fixed surface of the engine, and an outer portion of the pinion gear rotatable about the fixed central portion.

A further example of any of the foregoing assemblies, wherein the outer portion meshes with the ring gear and the first or second of the concentric drive shafts to drive rotation of the ring gear thereabout.

A further example of any of the foregoing assemblies, wherein the differential bullgear is supported to the first or second drive shaft by a second plurality of bearings.

A further example of any of the foregoing assemblies, further comprising an accessory drive system, including a towershaft and a plurality of accessories connected thereto.

A further example of any of the foregoing assemblies, wherein a size of the differential bullgear and a gear ratio of the differential bullgear, relative to the towershaft, are selected to selectively offtake a first portion of power to continuously maintain a minimum excess power margin on each of the first and second spools.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine engine assembly comprising:
   a first spool including a first spool accessory drive gear driven by a first rotor shaft, the first spool accessory drive gear includes a ring gear assembly;
   a second spool including a second spool accessory drive gear driven by a second rotor shaft, the second spool accessory drive gear includes a bullgear and the second rotor shaft is concentric around a portion of the first rotor shaft;
   a differential gear assembly adapted to offtake power from rotation of one or both of the first spool and the second spool to drive one or more accessory loads, the differential gear assembly comprising:
      one or more idler gears each including a plurality of teeth meshed with the first spool accessory drive gear and the second spool accessory drive gear, and a bearing surface; and
      a differential bull gear including a plurality of teeth and a corresponding at least one bearing surface engaging with the bearing surface of each of the one or more idler gears, the plurality of teeth adapted to mesh with an accessory drive system to transfer the power offtake and drive the one or more accessory loads; and
   the ring gear assembly including a ring gear supported by the first rotor shaft by a plurality of bearings and a pinion gear meshed with the ring gear, with the ring gear assembly being radially inward from the one or more idler gears.

2. The assembly of claim 1, wherein a fixed central portion of the pinion gear is mounted to a fixed surface of the engine.

3. The assembly of claim 2, wherein an outer portion of the pinion gear is rotatable about the fixed central portion.

4. The assembly of claim 1, wherein the differential bullgear is supported to the first rotor shaft by a second plurality of bearings.

5. The assembly of claim 1, wherein the first rotor shaft rotates in a first direction and the second rotor shaft rotates in a second direction opposite the first direction.

6. The assembly of claim 1, further comprising an accessory drive shaft as part of the accessory drive system.

7. The assembly of claim 6, wherein the accessory drive shaft comprises a towershaft.

8. The assembly of claim 7, wherein a size of the differential bullgear and a gear ratio of the differential bullgear, relative to the towershaft, are selected to selectively offtake a first portion of power from the first spool and a second portion of power from the second spool to drive a plurality of accessories connected to the towershaft.

* * * * *